(12) United States Patent
Schumacher et al.

(10) Patent No.: US 10,437,516 B2
(45) Date of Patent: *Oct. 8, 2019

(54) MICROCONTROLLER WITH INTEGRATED INTERFACE ENABLING READING DATA RANDOMLY FROM SERIAL FLASH MEMORY

(71) Applicant: Atmel Corporation, San Jose, CA (US)

(72) Inventors: Frédéric Schumacher, Trets (FR); Guillaume Pean, Aix en Provence (FR); Renaud Tiennot, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,359

(22) Filed: Feb. 1, 2018

(65) Prior Publication Data

US 2018/0157443 A1   Jun. 7, 2018

Related U.S. Application Data

(63) Continuation of application No. 15/093,064, filed on Apr. 7, 2016, now Pat. No. 9,921,778, which is a continuation of application No. 14/505,610, filed on Oct. 3, 2014, now Pat. No. 9,329,782, which is a continuation of application No. 13/630,002, filed on Sep. 28, 2012, now Pat. No. 8,880,785.

(51) Int. Cl.
*G06F 3/06* (2006.01)
*G06F 12/02* (2006.01)
*G06F 13/00* (2006.01)
*G06F 13/16* (2006.01)

(52) U.S. Cl.
CPC ............ *G06F 3/0659* (2013.01); *G06F 3/061* (2013.01); *G06F 3/0679* (2013.01); *G06F 12/0246* (2013.01); *G06F 13/00* (2013.01); *G06F 13/1694* (2013.01); *G06F 2206/1014* (2013.01)

(58) Field of Classification Search
None
See application file for complete search history.

(56) References Cited

U.S. PATENT DOCUMENTS

| | | |
|---|---|---|
| 2007/0113067 A1 | 5/2007 | Oh |
| 2007/0260757 A1 | 11/2007 | Bueb et al. |
| 2011/0153910 A1 | 6/2011 | MacKenna et al. |
| 2014/0095764 A1 | 4/2014 | Schumacher et al. |
| 2015/0149707 A1 | 5/2015 | Schumacher et al. |

*Primary Examiner* — Kevin Verbrugge
(74) *Attorney, Agent, or Firm* — Fish & Richardson P.C.

(57) ABSTRACT

A microcontroller includes a microprocessor, a serial flash memory interface, and input/output (I/O) terminals for coupling the serial flash memory interface to external serial flash memory. The microprocessor is operable to generate instruction frames that trigger respective commands to read data from specified addresses in the external serial flash memory. The serial flash memory interface receives and processes the instruction frames, obtains the data contained in the specified addresses in the external serial flash memory regardless of whether the specified addresses are sequential or non-sequential, and provides the data for use by the microprocessor.

20 Claims, 5 Drawing Sheets

MICROCONTROLLER WITH INTEGRATED INTERFACE ENABLING READING DATA RANDOMLY FROM SERIAL FLASH MEMORY

CLAIM OF PRIORITY

This application is a continuation of U.S. patent application Ser. No. 15/093,064 filed on Apr. 7, 2016, which is a continuation and claims priority under 35 USC § 119(e) to U.S. patent application Ser. No. 14/505,610 filed Oct. 3, 2014 (now U.S. Pat. No. 9,329,782 issued on May 3, 2016), which is a continuation of U.S. patent application Ser. No. 13/630,002, filed on Sep. 28, 2012 (now U.S. Pat. No. 8,880,785 issued Nov. 4, 2014), the entire contents of which are hereby incorporated by reference.

FIELD OF THE DISCLOSURE

The present disclosure relates to microcontrollers with an integrated interface that enables reading data randomly from serial flash memory.

BACKGROUND

Some microcontroller-based user software applications require large amounts of data to be stored in embedded flash memory. The size of the embedded flash memory may be limited, however, because of cost or other reasons. Thus, some implementations rely on an external flash memory. For situations in which size and performance are not critical, serial flash memories, which tend to be relatively small and less expensive, can be used instead of parallel flash memories, which tend to be faster and larger, but also more expensive. Serial flash memories, however, often are more difficult to control. For example, microprocessors generally cannot execute code or read/write data randomly directly from the serial memory.

SUMMARY

The present disclosure describes microcontrollers that include an integrated interface that enables reading data randomly from a serial flash memory.

For example, in one aspect, the disclosure describes a microcontroller that includes a microprocessor, a serial flash memory interface, and input/output (I/O) terminals for coupling the serial flash memory interface to external serial flash memory. The microprocessor is operable to generate instruction frames that trigger respective commands to read data from specified addresses in the external serial flash memory. The serial flash memory interface receives and processes the instruction frames, obtains the data contained in the specified addresses in the external serial flash memory regardless of whether the specified addresses are sequential or non-sequential, and provides the data for use by the microprocessor.

Some implementations include one or more of the following features. For example, in response to receiving the instruction frames generated by the microprocessor, the serial flash memory interface can launch one or more corresponding instruction frames, each of which contains a read command that triggers reading of a continuous stream of data from one or more sequential addresses in the external serial flash memory starting at a respective specified address. The serial flash memory interface can include a serial flash memory controller that determines how many instruction frames to launch based, at least in part, on whether or not the addresses specified in the instruction frames generated by the microprocessor are sequential, on whether the instruction frames generated by the microprocessor dictate a backward or forward jump in non-sequential addresses, and based on the distance from the address in a first one of the instruction frames to the address in the next one of the instruction frames if a forward jump is dictated.

The disclosure also describes methods of a microcontroller accessing data from external serial flash memory. For example, in one aspect, a method includes generating, by a microprocessor in the microcontroller, instruction frames that trigger respective commands to read data from specified addresses in the external serial flash memory. The method further includes receiving and processing the instruction frames in a serial flash memory interface in the microcontroller. The data contained in the specified addresses in the external serial flash memory is obtained, by way of the serial flash memory interface, regardless of whether the specified addresses are sequential or non-sequential. The data then can be provided for use by the microprocessor.

Some implementations include one or more of the following features. For example, the method can include, in response to receiving the instruction frames generated by the microprocessor, launching one or more corresponding instruction frames, each of which contains a read command that triggers reading of a continuous stream of data from one or more sequential addresses in the external serial flash memory starting at a respective specified address. The method also can include determining how many instruction frames are to be launched by the serial flash memory interface based, at least in part, on whether or not the addresses specified in the instruction frames generated by the microprocessor are sequential, on whether the instruction frames generated by the microprocessor dictate a backward or forward jump in non-sequential addresses, and on the distance from the address in a first one of the instruction frames to the address in the next one of the instruction frames if a forward jump is dictated.

The disclosure also describes a microcontroller-based system that includes a microcontroller and serial flash memory that is not integrated as part of the microcontroller (i.e., external serial flash memory).

Some implementations provide one or more of the following advantages. For example, data shadowing may not be required because the microprocessor can read data randomly (i.e., in a sequential or non-sequential manner) from addresses in external serial flash memory. Also, the amount of data stored in the serial flash memory need not be limited by cost and space considerations that may otherwise apply for on-chip serial flash memory. Thus, when speed is not critical, serial flash memories can be used instead of more expensive, parallel flash memories.

Integrating the cache memory into the serial flash memory interface can help reduce the average time to access the serial flash memory by storing locally copies of the data the most frequently used. Such techniques can be especially useful, for example, in the case of software code execution with short loops. The internal jump handling algorithm can help reduce latency by choosing the better option between issuing a new instruction and waiting the desired data in the current stream of data. In some implementations, processing of wrap transfers can be optimized by fetching data sequentially rather than using the wrap data order.

Other aspects, features and advantages will be apparent from the following detailed description, the accompanying drawings, and the claims.

DETAILED DESCRIPTION

Figure 1:
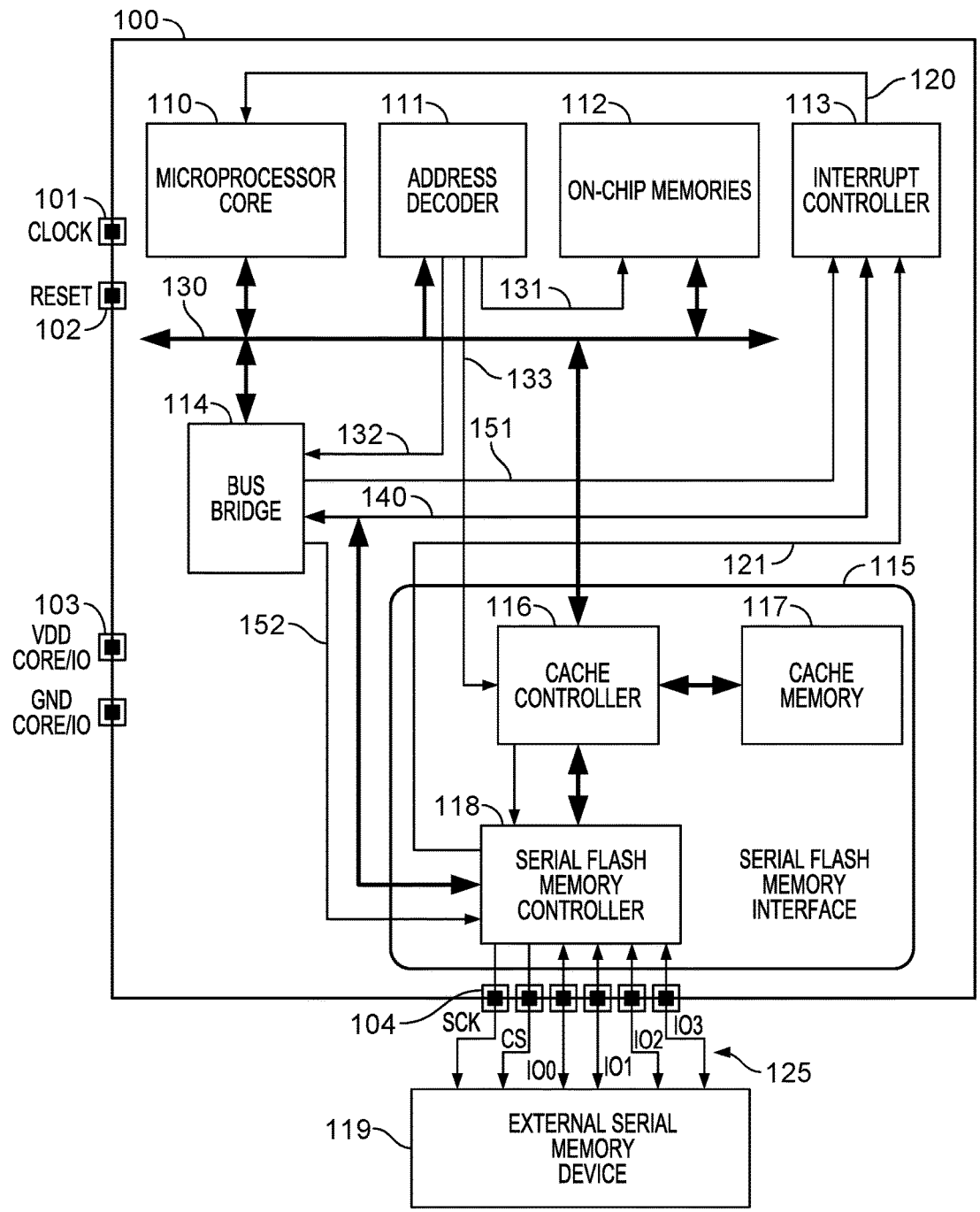
FIG. 1 illustrates an example of a microcontroller with a serial flash memory interface.

As illustrated in FIG. 1, a microcontroller 100 is implemented as an integrated circuit that includes a microprocessor core 110 and embedded on-chip memory devices 112 such as random access memory (RAM) and non-volatile flash memory. Microcontroller 100 also includes a serial flash memory interface 115 that can be coupled to an external serial flash memory device 119 through a Serial Peripheral Interface (SPI) bus 125. Microprocessor 110 is configured to access on-chip memories 112, serial flash memory interface 115 and other peripherals such as an interrupt controller 113.

Microcontroller 100 includes various input/output (I/O) terminals (e.g., I/O pins or pads), including a clock terminal 101, a reset terminal 102 and power terminals 103. Terminals 103 can include, for example, a series of physical access terminals to power microcontroller 100. Some of terminals 103 may be used to provide a voltage source VDD, whereas others may be used to connect to ground GND. Another set of I/O terminals 104 is provided to allow serial flash memory interface 115 to communicate with external serial memory device 119.

In some implementations, the components of microcontroller 100 exchange data using a high performance system bus 130, which can include a read data bus carrying data from peripherals 112, 113, 115 to microprocessor 110, a write data bus carrying data from the microprocessor 110 to peripherals 112, 113, 115, and an address bus carrying control signals to indicate the transfer direction on high performance system bus 130. Since the address bus that forms part of system bus 130 is shared by peripherals 112, 114, 115, an address decoder 111 can be used to decode the values carried on the address bus to select one peripheral at a time. Address decoder 111 is connected to the address bus that is part of system bus 130 and can provide select signals on lines 131, 132, 133. These select signals can be read by memory 112 and peripherals 114, 115 to take into account values carried on system bus 130.

On-chip memory 112 is selected when the signal in line 131 is active and the address value of the address bus matches the address range allocated for on-chip memory 112. In some implementations, address ranges are hardwired in address decoder 111. In response to being selected, the selected memory 112 or other peripheral 114, 115 provides corresponding data onto system bus 130, which is read by microprocessor 110 and processed according to application software.

In some implementations, a low-performance peripheral bus 140 is derived from high performance system bus 130. Low-performance peripheral bus 140 can be used to configure peripherals or to transfer data at a low rate. The link between the two busses 130, 140 is performed by a bus bridge 114. Like high performance system bus 130, low-performance peripheral bus 140 includes an address bus, a read data bus and a write data bus. Bus bridge 114 generates select signals on lines 151, 152 to peripherals 114, 115, in a manner similar to address decoder 111, depending on the address of high performance system bus 130.

In some implementations, microprocessor 110 detects availability of data through an interrupt signal on line 120. When set, the peripheral interrupt signal on line 121 triggers interrupt controller 113, which signals the event directly to a dedicated pin of microprocessor 110. When microprocessor 110 is triggered by the interrupt signal on line 120, its internal state machine interrupts processing of the current task and performs a read access with respect to the specified peripheral.

Microprocessor 110 accesses external serial flash memory 119 through serial flash memory interface 115. As illustrated in FIG. 1, serial flash memory interface 115 includes a cache controller 116 coupled to a cache memory 117 and to a serial flash memory controller 118. Cache controller 116, cache memory 117 and serial flash memory controller 118 are thus integrated as part of serial flash memory interface 115.

Cache controller 116 can be used to reduce the average time needed to access serial flash memory 119 by storing copies of the most frequently used data in cache memory 117, which is relatively fast. When microprocessor 110 requests data of serial flash memory 119 that already is stored in cache memory 117, cache controller 116 filters the data access request to serial flash memory controller 118, and returns the data stored in cache memory 117. As the data latency when reading serial flash memory 119 tends to be relatively high, cache controller 116 can increase efficiency, for example, when microprocessor 110 executes software stored in serial flash memory 119, or when the same data is read repeatedly (e.g., during execution of a software loop).

Serial flash memory controller 118 manages a communication protocol (e.g., SPI protocol) to control serial flash memory device 119. As mentioned previously, in the illustrated example, serial flash memory controller 118 and serial flash memory device 119 are connected together by SPI bus 125, which includes a clock signal SCK, a selection signal CS, and two or four data signals (IO0-IO3). Some SPI protocols use two unidirectional data lines, whereas other SPI protocols (e.g., dual and quad) use two or four bidirectional data lines. In some implementations, SPI bus 125 operates at a dual data rate (DDR) so as to double the bandwidth. Protocols other than SPI protocols can be used in some implementations.

Serial flash memory device 119 is controlled by a set of instructions sent over SPI bus 125. The instructions are used to trigger commands (e.g., READ, WRITE, ERASE, PROGRAM or CONFIGURE) inside serial flash memory 119. The various instructions can be sent in an instruction frame, an example of which is illustrated in FIG. 2.

Figure 2:
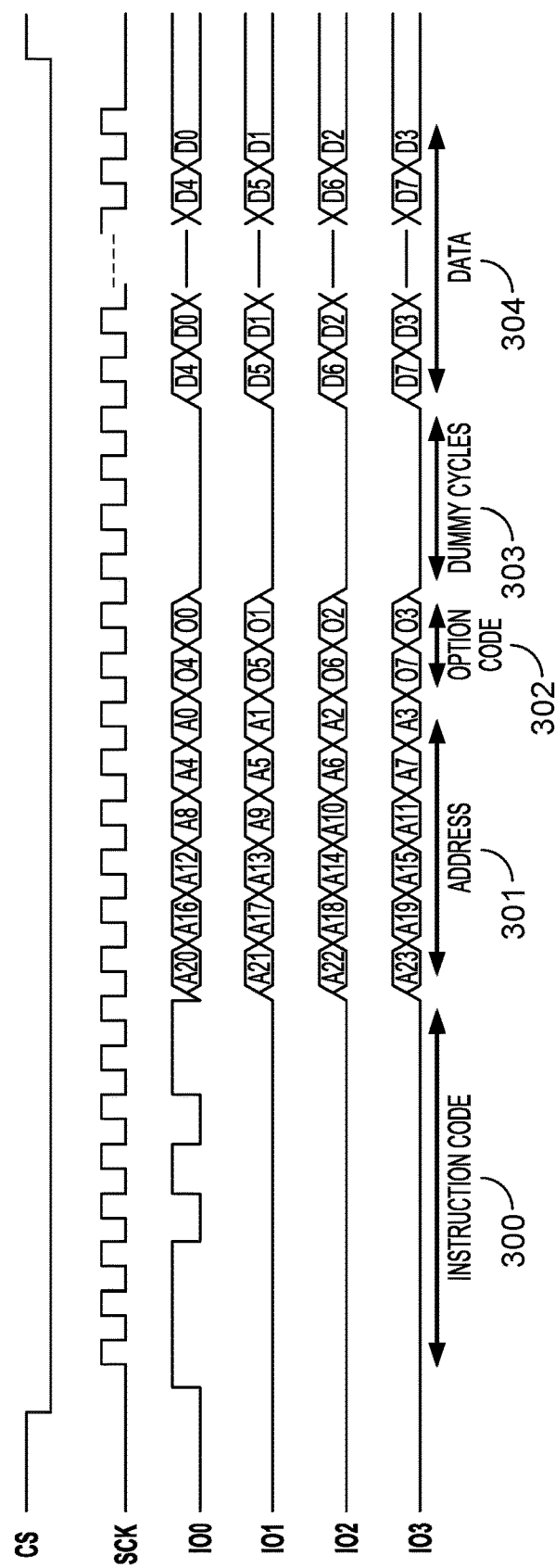
FIG. 2 illustrates an example of an instruction frame.

As illustrated in FIG. 2, the instruction frame includes an instruction code 300 to determine which action to trigger in the serial flash memory, followed by an address 301, an option code 302, one or more dummy cycles 303, and data 304. Depending on the type of memory device 119, the instruction code 300, the address 301, the option code 302 and the data 304 can be transmitted independently with one, two or four data lines. During the instruction frame, the chip select signal CS is asserted at low level to enable the instruction frame to be processed in serial flash memory 119. The instruction frame ends with the rising edge of the chip select signal CS.

Although each instruction frame includes an instruction code 300, the other items (i.e., address 301, option code 302, dummy cycles 303, and data 304) may not be needed and, therefore, would not be included for some instructions. When they are present in the instruction frame, instruction code 300, address 301 and option code 302 are sent from serial flash memory interface 115 to serial memory device 119. Dummy cycles 303 are used for READ instructions and serve as wait cycles required by serial flash memory device 119 in order to access the memory. The number of dummy cycles 303 may depend, for example, on the frequency of the serial clock SCK.

Data 304 can be sent either by interface 115 or by serial flash memory 119, depending on whether the instruction code triggers a READ or a PROGRAM command in serial flash memory 119. In some implementations, the instruction code 300 is 8-bits in length, the address is 24-bits or 32-bits in length, and the option code is 8-bits in length. In general, the number of bytes of data 304 will depend on instruction code 300. For example, a data READ command triggers a continuous stream of data from serial flash memory 119. The first transmitted byte is located in serial flash memory 119 at an address specified in the instruction frame. After each byte is accessed, the address is incremented automatically to the next (i.e., sequential) address in serial flash memory 119. In this way, the entire content of serial flash memory 119 can be read using only a single instruction frame. Similarly, a data WRITE command triggers a continuous stream of data to be written from serial flash memory controller 118. The first transmitted byte is written in serial flash memory 119 at an address specified in the instruction frame. After each byte, the address is incremented automatically in serial flash memory 119.

Figure 3:
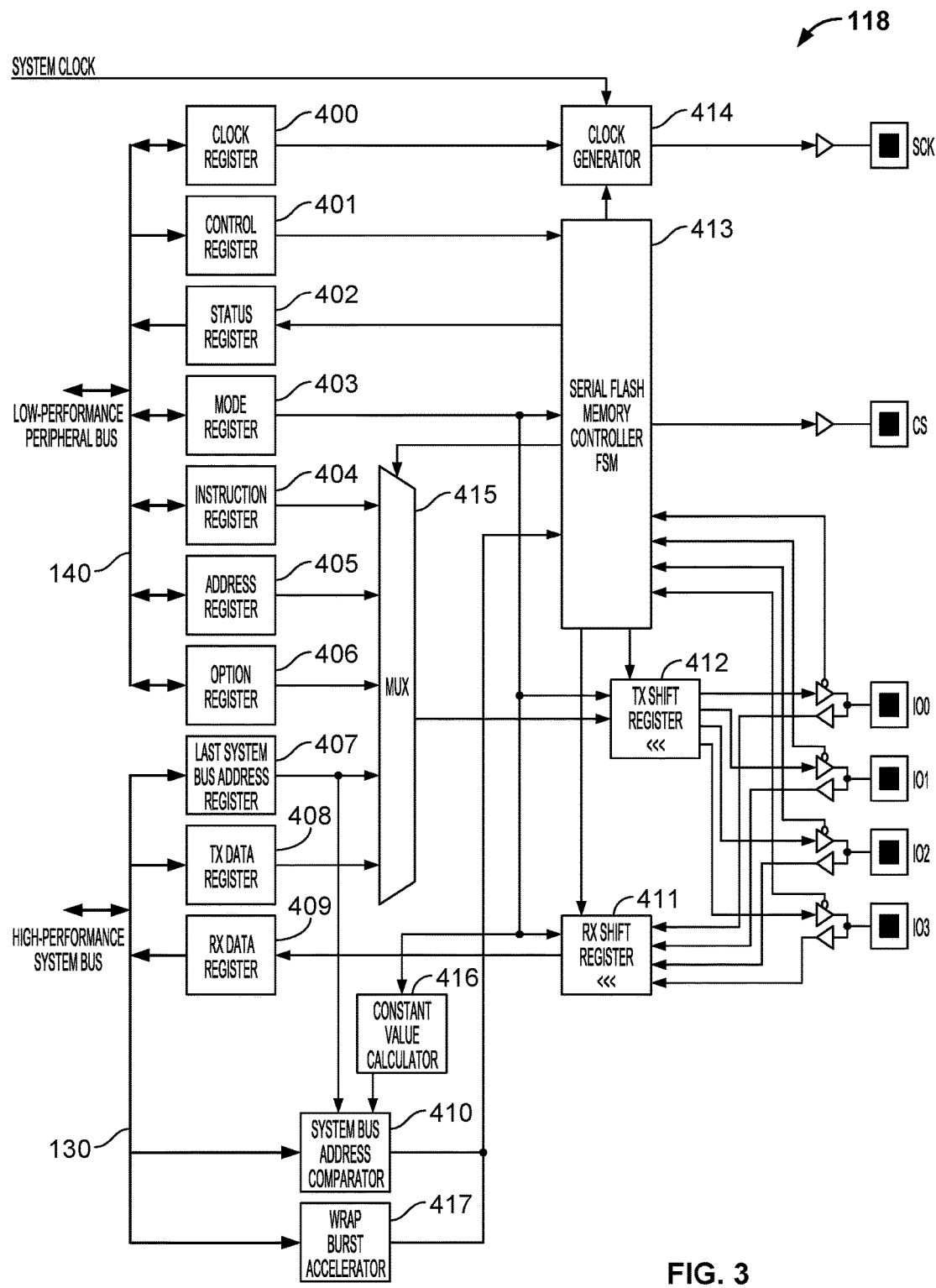
FIG. 3 illustrates an example of a serial flash memory controller.

Further details of serial flash memory controller 118 according to some implementations are illustrated in FIG. 3. Low-performance peripheral bus 140 can be used to configure, control and read the status of serial flash memory controller 118. In the illustrated implementation, high-performance system bus 130 is used exclusively to transfer data through serial flash memory controller 118.

For example, to send an instruction to serial memory device 119, microprocessor 110 configures an instruction frame by writing to configuration registers 400, 403, 404, 405 and 406 using low-performance peripheral bus 140. Registers 400, 403, 404, 405 and 406 allow serial flash memory controller 118 to be capable of handling different types of instruction frames, which may vary from one memory vendor to another.

In the illustrated example, clock register 400 is used to configure the frequency of serial clock SCK by defining a division factor relative to the system clock. It also configures the polarity and phase of the serial clock SCK compared to the transmitted data. The polarity and the phase define which SPI clock mode is used (e.g., Mode 0-3).

Mode register 403 is used to configure various aspects of the instruction frame. In the illustrated example, mode register 403 enables transmission of the address, defines the length of the address (e.g., 24-bit or 32-bit), enables the option transmit, enables the transmission of data, defines the data direction if data transmit is enabled, defines the number of dummy cycles, and defines the number of data lines used by the instruction code, the address, the option and the data (e.g., 1, 2 or 4).

Instruction register 404 is used to configure instruction code 300 for transmission. Address register 405 defines the address to transmit in case data transmission is not enabled. If data transmission is enabled, the address transmitted in the instruction frame is defined by the high-performance system bus data access that occurs after writing to the configurations registers. Option register 406 is used to configure the option code for transmission. An option code may be required by some serial flash memories to activate special features.

When transmission of an instruction frame is in progress, the information to be transmitted is selected by a multiplexor 415. The information includes instruction code 300, address 301, option code 302 and, in the case of a WRITE instruction, data 304 from high-performance system bus 130 stored in TX data register 408. Multiplexor 415 is controlled by a signal from serial flash memory controller finite state machine (FSM) 413. Serial flash memory controller 118 also includes a last system bus address register 407.

After the data is selected by multiplexor 415, it is serialized by TX shift register 412. The transmit configuration can be programmed in mode register 403. If single-bit SPI is selected, the data is transmitted over terminal IO0; if dual SPI is selected, the data is transmitted over terminals IO0 and IO1; if quad SPI is selected, the data is transmitted over terminals IO0, IO1, IO2 and IO3.

In the case of a READ command, the data from serial flash memory 119 is serialized by RX shift register 411. RX shift register can sample the data with one, two or four data lines (IO0-IO3), depending on the configuration programmed in mode register 403.

High-performance system bus 130 can carry a wait signal, which allows delaying the bus master data access. Serial flash memory controller FSM 413 is thereby able to synchronize the TX shift register 412 and RX shift register 411 with the high-performance system bus data accesses.

When data is disabled in the instruction frame, only one instruction frame is launched by the serial flash memory controller FSM 413. Transmission of the instruction frame begins as soon as instruction register 404 is written. Once the entire instruction frame has been transmitted, a flag is set in status register 402, which informs microprocessor 110 that the instruction frame is ended and that a new instruction can be sent. The flag triggers an interrupt in interrupt controller 113 by a dedicated signal.

When a data WRITE command is enabled in the instruction frame, only one instruction frame is launched by serial flash memory controller FSM 413. Transmission of the instruction frame begins as soon as a data write access from high-performance system bus 130 is detected. For example, as little as one byte and as much as one page of data can be programmed in serial flash memory 413 in connection with a data WRITE command, depending on the amount of data sent by serial flash memory controller 118.

The address sent by serial flash memory controller 118 is the address of the first WRITE access. The addresses of any subsequent WRITE accesses are not used by serial flash memory controller 118 because the WRITE accesses are supposed to be sequential. Software informs serial flash memory controller 118 when the data WRITE transfer through high-performance system bus 130 is completed by writing to control register 401. Serial flash memory controller 118 then aborts the instruction frame transmit operation and informs microprocessor 110, by setting the flag in status register 402, that the instruction frame has ended and a new instruction can be sent.

When a data READ command is enabled in the instruction frame, one or more instruction frames can be launched by serial flash memory controller FSM 413 to support random reading of addresses in serial flash memory device 119. In the present disclosure, random reading of serial flash memory device 119 refers to the ability to read memory addresses sequentially or non-sequentially (i.e., in any specified order). Random reading of addresses in serial flash memory device 119 can be particularly useful, for example, when software code is stored in the serial flash memory, and microprocessor 110 executes the code directly from the serial flash memory. The instruction frame can start to be transmitted as soon as a data READ access request is detected from high-performance system bus 130.

The address sent by serial flash memory controller 118 to serial flash memory device 119 is the address of the first READ access request. So long as the READ access commands specify sequential addresses in serial flash memory 119, the initial instruction frame is sufficient to allow all the requested data to be read from serial flash memory 119 because serial flash memory 119 outputs a stream of data by sequentially incrementing the memory addresses. However, when READ access operations specify non-sequential addresses, a system bus address comparator 410, which compares the address of the current READ access operation and the address of the last READ access operation, defines three possibilities, as described below.

In a first scenario, which can be referred to as a 'backward' jump, the address of the READ access operation is lower than the address of the previous READ access request. In this case, serial flash memory controller FSM 413 launches a new instruction frame to obtain the desired data. In a second scenario, which can be referred to as a 'small forward' jump, the address of the READ access operation is higher than the address of the previous READ access operation, and the number of clock cycles required to read the data from the specified memory address as part of the current stream of data is less than or equal to a value computed by a constant value calculator 416. This latter condition means it is more efficient (i.e., requires less time) to wait for the serial flash memory 119 to read out the data sequentially in the current stream of data than to launch a new instruction frame. In a third scenario, which can be referred to as a 'large forward' jump, the address of the READ access operation is higher than the address of the previous READ access operation, but the number of clock cycles required to read the data from the specified memory address as part of the current stream of data is greater than the value computed by constant value calculator 416. This latter condition means that it is more efficient (i.e., requires less time) to launch a new instruction frame with the address for the current READ access than to wait for the serial flash memory 119 to read out the data sequentially in the current stream of data. Thus, based on the output of system bus address comparator 410, when the first or third scenario is detected, a new instruction frame is launched by serial flash memory controller FSM 413, whereas when the second scenario is detected, serial flash memory controller FSM 413 waits for the serial flash memory 119 to read out the data sequentially in the current stream of data rather than launching a new instruction frame.

As the data is read from serial flash memory 119 and provided over SPI bus 125 to RX shift register 411, serial flash memory controller FSM 413 provides control signals to RX shift register 411 so as to specify which of the received data is to be passed onto RX data register 409 and, from there, to high-performance system bus 130. For example, in the second scenario, since serial flash memory controller FSM 413 waits for the serial flash memory 119 to read out the data sequentially in the current stream of data rather than launching a new instruction frame even though there is a jump in the address from one READ access operation to the next READ operation, serial flash memory controller FSM 413 causes RX shift register 411 to pass only the data from the desired memory addresses to X data register 409. Serial flash memory controller 118 also includes a last system bus address register 407.

The value computed by constant value calculator 416 corresponds to the data latency (i.e., the number of clock cycles required to access the data when sending a new instruction frame). It includes the number of data cycles to transmit the instruction code 300, as well as the address 301, the option code 302 and the number of dummy cycles 303, when present. Thus, this value is dependent of the configuration stored in mode register 403.

Software informs serial flash memory controller 118 when the transfer of the desired data from serial memory device 119 through the high-performance system bus is complete by writing to control register 401. Serial flash memory controller 118 then aborts the instruction frame transmission, and informs microprocessor 110, by setting the flag in status register 402, that the instruction frame has ended and a new instruction can be sent.

The foregoing implementation allows data to be accessed and read from external serial memory device 119 in any order in an efficient manner. In particular, data from addresses in memory device 119 can be read in an efficient manner even if the addresses are not sequential. The techniques can help optimize efficiency in reading the data from external memory device 119 by determining whether it is more efficient to wait for serial flash memory 119 to read out the data sequentially in the current stream of data or to launch a new instruction frame.

Some implementations include a further optimization relating to wrap burst. For example, whereas an incremental burst accesses sequential memory locations (e.g., 0x64, 0x68, 0x6C, 0x70 for an INCR4 that transfers four bytes of data), a wrap burst wraps around an address if the starting address is not aligned to the total number of bytes in the transfer (e.g., 0x64, 0x68, 0x6C, 0x60 for a WRAP4 that transfers four bytes of data). When a wrap burst instruction is issued on high-performance system bus 130, there will be a 'backward' jump which means that, in the absence of the optimization described below, serial flash memory controller FSM 413 would need to launch a new instruction frame to obtain the desired data. On the other hand, in some implementations, serial flash memory controller 118 detects that the current burst is a wrap burst and uses this information to obtain all the data required to complete the burst sequentially.

Figure 4A:
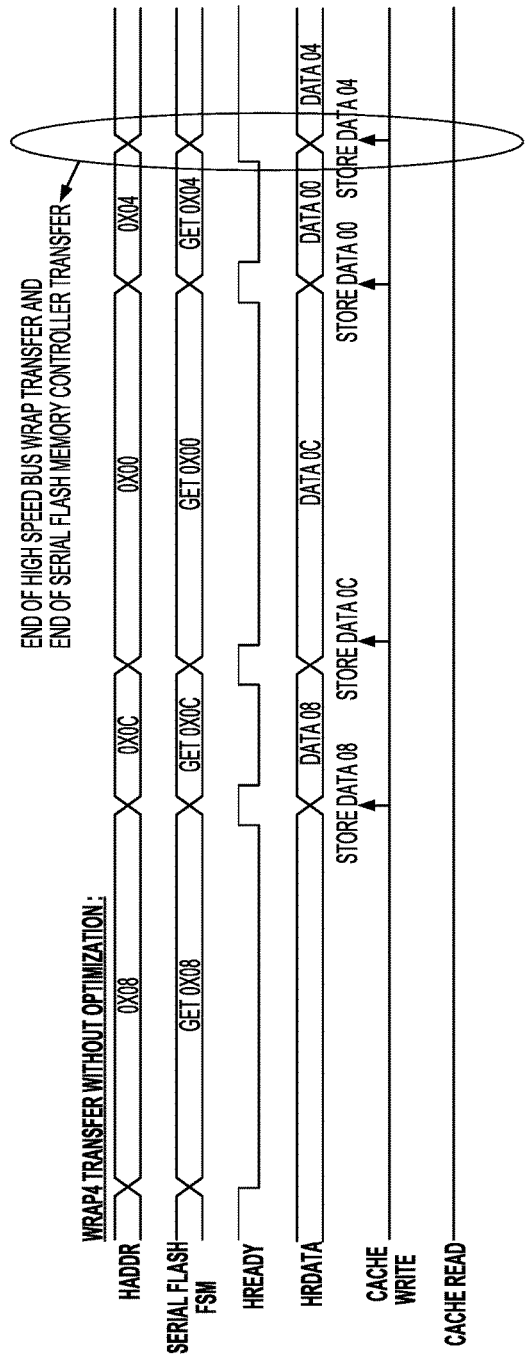
FIG. 4A is an example of a timing diagram of signals in connection with a wrap transfer according to a first implementation.
Figure 4B:
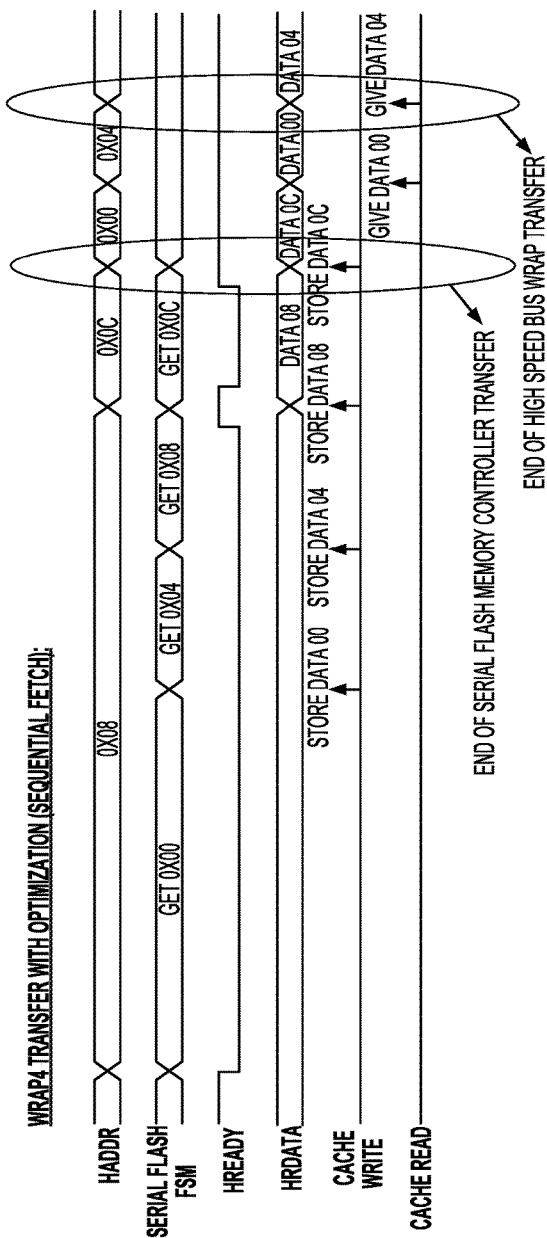
FIG. 4B is an example of a timing diagram of signals in connection with a wrap transfer according to a second implementation.

A comparison of FIGS. 4A and 4B illustrates how the overall latency can be reduced by obtaining the data sequentially rather than using the wrap sequence. Without wrap burst optimization (FIG. 4A), serial flash memory interface 115 fetches data in the same order as the wrap burst instruction (i.e., 0x08, 0x0C, 0x00, 0x04, in the illustrated example). Thus, for a WRAP4 burst starting at address 0x08, a 'backward' jump would be required to go from address 0x0C to address 0x00. The 'backward' jump means that launching a new instruction is required, which results in greater overall latency. Therefore, in the illustrated example, the whole transfer is impacted two times by the instruction launch latency (i.e., one time for address 0x08 and a second time for address 0x00).

The overall latency can be reduced if serial flash memory interface 115 can fetch data sequentially for wrap transfers.

As shown in FIG. 4B, if the data is fetched sequentially (i.e., 0x00, 0x04, 0x08, 0x0C, in the illustrated example), the whole transfer is impacted only once by the new instruction launch latency for address 0x00. The first transfer wrap will be delayed slightly as the system needs to fetch data from memory addresses 0x00 and 0x04 first. That data then is stored in cache memory 117 so that after data from memory address 0x0C is fetched, the remaining data required to end the wrap burst already are in internal cache memory 117. Thus, the last two transfers are completed using the data from internal cache memory 117, which provides relatively fast access. The overall WRAP4 transfer can be executed more quickly using sequential fetching. A wrap transfer accelerator 417 is configured to ensure sequential fetching for wrap transfer in accordance with the foregoing optimized performance.

Serial flash memory interface 115 thus facilitates interfacing serial flash memory 119 with the microcontroller's internal system bus for the purpose of reading/writing data automatically from/to serial flash memory 119 without requiring any user action once the microcontroller is configured. Integrating cache memory 117 and cache controller 116 with serial flash memory interface 115 can help reduce the latency for frequently used data. Furthermore, performance can be enhanced by the jump handling algorithm implemented by system bus address comparator 410, which chooses between issuing a new READ instruction and waiting for the desired data in the current data stream so as to reduce the overall latency. A further enhancement can be provided by fetching data sequentially for wrap transfers.

Figure 5:
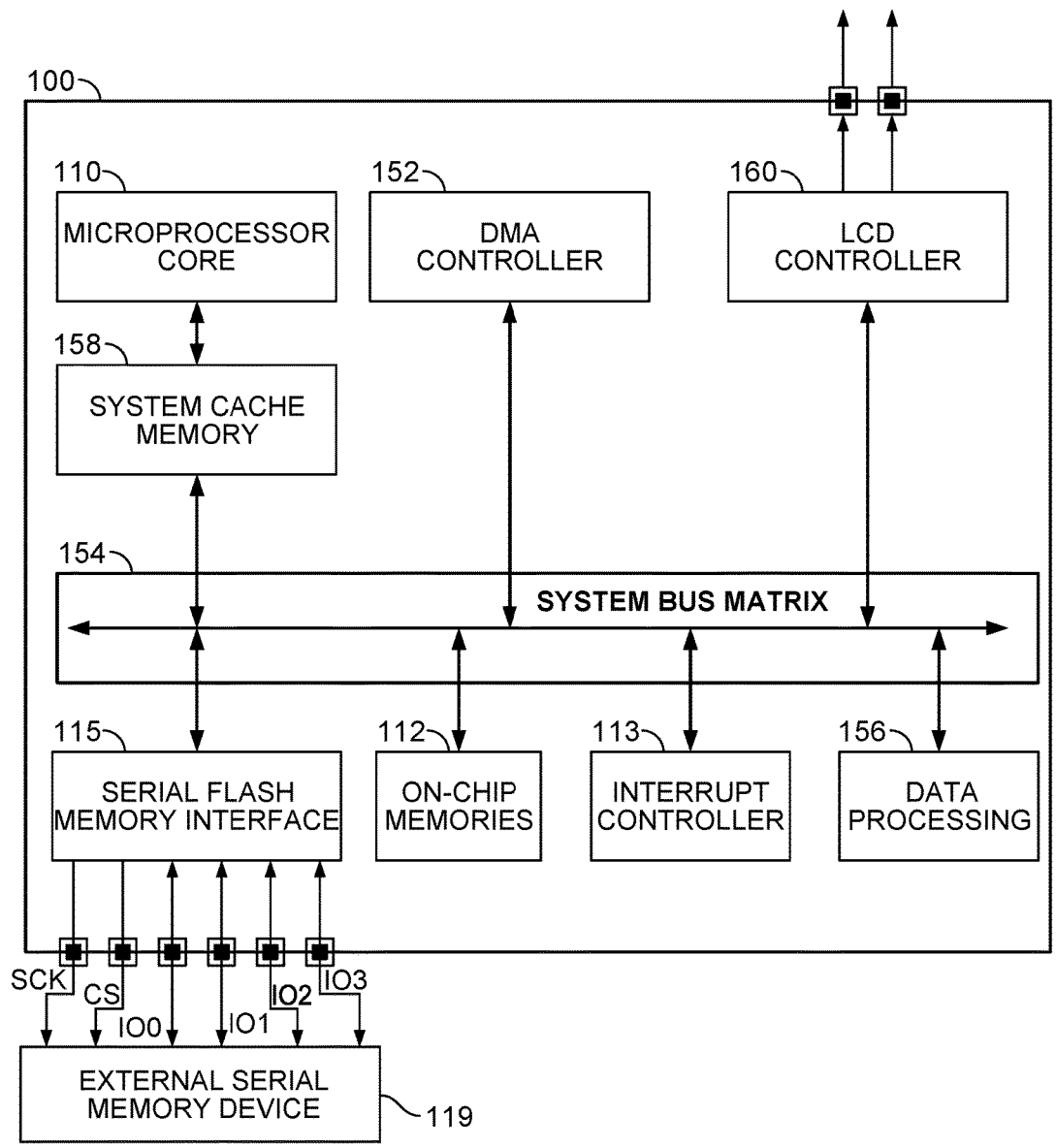
FIG. 5 illustrates another example of a microcontroller with a serial flash memory interface.

As described in the foregoing implementations, integrating cache memory 117 into serial flash memory interface 115 can be advantageous in some cases. Nevertheless, some implementations of the microcontroller may incorporate cache memory outside the serial flash memory interface rather than integrating the cache memory into the interface. FIG. 5 illustrates an example of such an architecture.

As shown in FIG. 5, microcontroller 100A includes system cache memory 158 and peripherals, including serial flash memory interface 115, interrupt controller 113 and DMA controller 152. Address decoding functionality is included in system bus matrix 154. In the example of FIG. 5, system cache memory 158 is located between microprocessor core 110 and system bus matrix 154 so that performance can be increased. For instances of software code execution that involve loading the same upcode multiple times, system cache memory 158 can help reduce the latency for frequently used upcodes.

On the other hand, if DMA controller 152 needs to transfer data, for example, from external serial memory device 119 to data processing unit 108, DMA controller 152 cannot take advantage of system cache memory 158 to reduce the latency on frequently used data. Thus, it may be desirable to integrate cache memory into serial flash memory interface 115 to facilitate reducing the latency with respect to frequently used data for other masters (e.g., DMA controller 152 or LCD controller 160) in situations where the other masters cannot benefit from system cache memory 158.

Other implementations are within the scope of the claims.

What is claimed is:

1. A method of a microcontroller accessing data from external serial flash memory, the method comprising:

configuring, by a microprocessor in the microcontroller, instruction frames that trigger respective data read commands and data write commands with respect to addresses in the external serial flash memory;

processing the instruction frames in a serial flash memory interface in the microcontroller; and in response to a data write command being enabled in a particular instruction frame configured by the microprocessor, launching by the serial flash memory interface an instruction frame to enable writing of data to an address in the external serial flash memory based on an address specified in the particular instruction frame configured by the microprocessor.

2. The method of claim 1 including launching only one instruction frame by the serial flash memory interface in response to the data write command being enabled in the particular instruction frame.

3. The method of claim 2 including beginning transmission of the instruction frame by the serial flash memory interface in response to detecting a data write access from a system bus in the microcontroller.

4. The method of claim 1 wherein, in response to detecting multiple write accesses, the instruction frame launched by the serial flash memory interface includes an address only of a first one of the write accesses.

5. The method of claim 4 wherein, in response to detecting multiple write accesses, addresses of write accesses following the first one of the write accesses are not used by the serial flash memory interface to write to the external serial flash memory.

6. The method of claim 5 wherein write accesses following the first one of the write accesses are performed with respect to memory locations in the external serial flash memory that sequentially follow a memory location of the first one of the write accesses.

7. The method of claim 1 wherein, in response to receiving, in the serial flash memory interface, an indication that a data write transfer through a system bus in the microcontroller is completed, the serial flash memory interface aborts an instruction frame transmit operation.

8. The method of claim 7 wherein, in response to receiving, in the serial flash memory interface, the indication that the data write transfer through the system bus is completed, the serial flash memory interface informs the microprocessor that the instruction frame has ended.

9. A microcontroller comprising:

a microprocessor;

a serial flash memory interface; and input/output (I/O) terminals coupled to the serial flash memory interface, the I/O terminals operable to couple the serial flash memory interface to external serial flash memory, wherein the microprocessor is operable to configure instruction frames that trigger respective data read commands and data write commands with respect to addresses in the external serial flash memory, and wherein the serial flash memory interface is operable to process the instruction frames and, in response to a data write command being enabled in a particular instruction frame configured by the microprocessor, to launch an instruction frame to enable writing of data to an address in the external serial flash memory based on an address specified in the particular instruction frame configured by the microprocessor.

10. The microcontroller of claim 9 wherein the serial flash memory interface is operable to launch only one instruction frame in response to the data write command being enabled in the particular instruction frame.

11. The microcontroller of claim 10 further including a system bus coupled to the microprocessor and the serial flash memory interface, wherein the serial flash memory interface is operable to begin transmission of the instruction frame in response to detecting a data write access from the system bus.

12. The microcontroller of claim 10 wherein, in response to detecting multiple write accesses, the serial flash memory interface is operable to launch an instruction frame including an address only of a first one of the write accesses.

13. The microcontroller of claim 12 wherein, in response to detecting multiple write accesses, the serial flash memory interface is operable to write to the external serial flash memory without using addresses of write accesses following the first one of the write accesses.

14. The microcontroller of claim 13 wherein write accesses following the first one of the write accesses are performed with respect to memory locations in the external serial flash memory that sequentially follow a memory location of the first one of the write accesses.

15. The microcontroller of claim 9 further including a system bus coupled to the microprocessor and the serial flash memory interface,
wherein the serial flash memory interface is operable, in response to receiving an indication that a data write transfer through the system bus is completed, to abort an instruction frame transmit operation.

16. The microcontroller of claim 15 wherein the serial flash memory interface is further operable, in response to receiving the indication that the data write transfer through the system bus is completed, to inform the microprocessor that the instruction frame launched by the serial flash memory interface has ended.

17. A system comprising:
a microcontroller; and
a serial flash memory external to the microcontroller,
wherein the microcontroller includes:
a microprocessor;
a serial flash memory interface; and
input/output (I/O) terminals coupled to the serial flash memory interface, the I/O terminals operable to couple the serial flash memory interface to the external serial flash memory,
wherein the microprocessor is operable to configure instruction frames that trigger respective data read commands and data write commands with respect to addresses in the external serial flash memory, and
wherein the serial flash memory interface is operable to process the instruction frames and, in response to a data write command being enabled in a particular instruction frame configured by the microprocessor, to launch an instruction frame to enable writing of data to an address in the external serial flash memory based on an address specified in the particular instruction frame configured by the microprocessor.

18. The system of claim 17 wherein the microcontroller further includes a system bus coupled to the microprocessor and the serial flash memory interface,
wherein the serial flash memory interface is operable to begin transmission of the instruction frame in response to detecting a data write access from the system bus, and in response to detecting multiple write accesses, to launch an instruction frame including an address only of a first one of the write accesses.

19. The system of claim 18 wherein the serial flash memory interface is operable, in response to detecting multiple write accesses, to write to the external serial flash memory without using addresses of write accesses following the first one of the write accesses.

20. The system of claim 19 wherein the system is operable such that write accesses following the first one of the write accesses are performed with respect to memory locations in the external serial flash memory that sequentially follow a memory location of the first one of the write accesses.

* * * * *